UNITED STATES PATENT OFFICE.

LOUIS STOCKER, OF GRAHAMTON, KENTUCKY.

RAZOR-SHARPENING COMPOUND.

1,027,927.     Specification of Letters Patent.     Patented May 28, 1912.

No Drawing.     Application filed July 17, 1911. Serial No. 639,048.

*To all whom it may concern:*

Be it known that I, LOUIS STOCKER, a citizen of the United States, residing at Grahamton, in the county of Meade and State of Kentucky, have invented certain new and useful Improvements in Razor-Sharpening Compounds; and I do declare the following to be a full, clear, and exact description of the invention, such as will enable others skilled in the art to which it appertains to make and use the same.

This invention relates to a new and useful composition of matter adapted to be applied to razor strops and the like whereby the same are rendered more efficient for sharpening razors or knives.

My improved composition consists of the following ingredients combined in the proportions stated, viz; paraffin wax and fine graphite free from grit, as much of the latter as the wax will take up when in a melted state.

In preparing the composition the paraffin is melted by heat and the graphite thoroughly commingled therewith by agitation while the paraffin is hot. After thus being prepared the composition is molded into blocks or sticks and when cooled and hard is ready for use.

In using the above named composition the same is well rubbed into the strop after which the strop is rubbed off with a clean cloth which will remove all of the surplus composition. This operation will fill the strop with the composition and will greatly increase the sharpening qualities thereof.

I claim:

A block or stick for rubbing on the surface of razor-strops consisting of melted paraffin having fine graphite free from grit incorporated with it, substantially as described.

In testimony whereof I have hereunto set my hand in presence of two subscribing witnesses.

LOUIS STOCKER.

Witnesses:
WILL P. FORBIS,
G. R. CRUTCHER.